(12) United States Patent
Wang et al.

(10) Patent No.: US 11,941,872 B2
(45) Date of Patent: Mar. 26, 2024

(54) PROGRESSIVE LOCALIZATION METHOD FOR TEXT-TO-VIDEO CLIP LOCALIZATION

(71) Applicant: ZHEJIANG GONGSHANG UNIVERSITY, Zhejiang (CN)

(72) Inventors: Xun Wang, Hangzhou (CN); Jianfeng Dong, Hangzhou (CN); Qi Zheng, Hangzhou (CN); Jingwei Peng, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/303,534

(22) Filed: Apr. 19, 2023

(65) Prior Publication Data

US 2023/0260267 A1 Aug. 17, 2023

Related U.S. Application Data

(63) Continuation of application No. PCT/CN2020/127657, filed on Nov. 10, 2020.

(30) Foreign Application Priority Data

Oct. 27, 2020 (CN) .......................... 202011164289.2

(51) Int. Cl.
*G06V 10/80* (2022.01)
*G06V 10/82* (2022.01)
*G06V 20/40* (2022.01)

(52) U.S. Cl.
CPC ............ *G06V 10/806* (2022.01); *G06V 10/82* (2022.01); *G06V 20/46* (2022.01)

(58) Field of Classification Search
CPC ........ G06V 20/46; G06V 20/40; G06V 20/41; G06V 20/48; G06F 16/7844; G06F 16/783; H04N 21/44008; G06N 3/045
See application file for complete search history.

(56) References Cited

U.S. PATENT DOCUMENTS

| 6,774,917 | B1 | 8/2004 | Foote et al. |
| 2017/0127016 | A1 | 5/2017 | Yu et al. |
| 2017/0330363 | A1 | 11/2017 | Song et al. |
| 2019/0138798 | A1 | 5/2019 | Tang et al. |
| 2020/0302294 | A1 | 9/2020 | Kadav et al. |

FOREIGN PATENT DOCUMENTS

| CN | 109145712 A | 1/2019 |
| CN | 110083741 A | 8/2019 |

(Continued)

OTHER PUBLICATIONS

F. Long, T. Yao, Z. Qiu, X. Tian, T. Mei and J. Luo, "Coarse-to-Fine Localization of Temporal Action Proposals," in IEEE Transactions on Multimedia, vol. 22, No. 6, pp. 1577-1590, Jun. 2020, doi: 10.1109/TMM.2019.2943204. (Year: 2019).*

(Continued)

*Primary Examiner* — Ross Varndell
(74) *Attorney, Agent, or Firm* — W&G Law Group

(57) ABSTRACT

A progressive localization method for text-to-video clip localization. The method comprises: first, respectively extracting features of two modes, namely a video mode and a text mode by using different feature extraction methods; then progressively selecting different step sizes, and learning the correlation between the video and the text in multiple stages; and finally, training a model in an end-to-end manner based on the correlation loss of each stage. Moreover, the fine time granularity stage is fused with information of the coarse time granularity stage by means of a condition feature update module and up-sampling connection, such that different stages are mutually promoted. Different stages can pay attention to clips with different time granularities, and the model can cope with the situation that the length of a target clip is obviously changed based on the interrelation between the stages.

10 Claims, 2 Drawing Sheets

(56) References Cited

FOREIGN PATENT DOCUMENTS

| | | | | |
|---|---|---|---|---|
| CN | 110121118 A | * | 8/2019 | ........... G06F 16/739 |
| CN | 110121118 A | | 8/2019 | |
| CN | 110704601 A | | 1/2020 | |
| CN | 111414845 A | | 7/2020 | |
| CN | 111582170 A | | 8/2020 | |
| WO | 2018081751 A1 | | 5/2018 | |

OTHER PUBLICATIONS

K. Ning, M. Cai, D. Xie and F. Wu, "An Attentive Sequence to Sequence Translator for Localizing Video Clips by Natural Language," in IEEE Transactions on Multimedia, vol. 22, No. 9, pp. 2434-2443, Sep. 2020, doi: 10.1109/TMM.2019.2957854. (Year: 2020).*
Hahn, Meera, et al. "Tripping through time: Efficient localization of activities in videos." arXiv preprint arXiv:1904.09936 (2019). (Year: 2019).*
International Search Report (PCT/CN2020/127657); dated Jul. 27, 2021.
CN First Office Action(CN202011164289.2); dated Jan. 20, 2022.
CN Notice Of Allowance(CN202011164289.2); dated Mar. 22, 2022.
Wonderful-events-automatic-detection-and-location-of-the-HCRF-and-webcast-text.
Cross-modal-video-moment-retrieval-based-on-visual-textual-relationship-lignment.

* cited by examiner

PROGRESSIVE LOCALIZATION METHOD FOR TEXT-TO-VIDEO CLIP LOCALIZATION

CROSS-REFERENCE TO RELATED APPLICATIONS

The present application is a continuation of International Application No. PCT/CN2020/127657, filed on Nov. 10, 2020, which claims priority to Chinese Application No. 202011164289.2, filed on Oct. 27, 2020, the contents of both of which are incorporated herein by reference in their entireties.

TECHNICAL FIELD

The present disclosure relates to the technical field of multimedia understanding, in particular to a progressive localization method for text-to-video clip localization.

BACKGROUND

In recent years, due to the popularity of Internet and mobile smart devices and the rapid development of communication and multimedia technologies, a large number of videos are created and uploaded to the Internet every day. Faced with such huge video data, how to quickly and accurately find out the videos users needed is a grand challenge. Traditional tag-based retrieval cannot adapt to the diversity of video content, while text-based retrieval can only get the whole video, which can't fully meet users' needs, because users may only be interested in a specific clip of the video. Therefore, the task of text-based video clip localization has been put forward and attracted the attention of researchers. Its goal is to find a clip with the most semantic relevance from a complete video according to the query text. With the text-based video clip localization, users can turn the content they are interested in by a text description, and then find the desired clip.

Because of the openness of the task, that is, the content that users are interested in can be long or short, the length of the target clip show a large variation. Most of the existing researches are to generate enough candidate clips with different lengths at first, then compare their similarities scores with the query text, and select the most relevant candidate clip as the final video clip. Therefore, how to generate high-quality candidate clips is the key problem to solve this task. Most of the existing researches are to divide the video into a series of basic clips with a fixed step size at first, and then combine those clips that are continuous in time and have different lengths to obtain candidate clips with various lengths. Hence, it is very important to select the step size of video cutting. The larger the step size, the coarser the time granularity of the clip generated by segmentation, and the candidate clip obtained may be difficult to cope with the shorter target clip. However, a smaller step size means that the clips generated by segmentation have finer time granularity, which can cope with the shorter target clips, but it will make the candidate clips contain more redundant information and hinder the optimization of learning objectives. The existing methods can only produce clips with unique granularity by using a single step size, and it is difficult to achieve a balance between coping ability and model optimization.

SUMMARY

In view of the shortcomings of the prior art, the present disclosure adopts a multi-stage coarse-to-fine method, and proposes a progressive localization network. The network obtains candidate clips with different time granularities by selecting different step sizes in multiple stages, and each stage has a localization branch to learn the similarity between candidate clips with different time granularities and texts. At the same time, through a CFU (Conditional Feature Update) module and a up-sampling connection, the learning information of the coarse time granularity branch is transferred to the fine time granularity branch, so that the model can cope with the obvious change of the target clip length, which greatly improves the localization performance.

The purpose of the present disclosure is realized by the following technical solution: a progressive localization method for text-to-video clip localization includes the following steps:

Step 1, extracting video features and text features respectively by using different feature extraction methods;

Step 2, a coarse time granularity localization stage: sampling the video features obtained in step 1 with a first step size and generating candidate clips;

Step 3, fusing the candidate clips in step 2 with the text features obtained in step 1;

Step 4, feeding the fused features to a convolution neural network to obtain a coarse-grained feature map, and then obtaining a correlation score may by an extra FC layer;

Step 5, a fine time granularity localization stage: sampling the video features obtained in step 1 with a second step size, updating the features by a conditional feature update module under guidance of the feature map obtained in step (4), and then generating candidate clips;

Step 6, fusing the candidate clip in step 5 with the text features obtained in step 1, and fusing the information of the previous stage by combining the feature matrix obtained in step 4 through up-sampling connection;

Step 7, feeding the fused features to the convolution neural network to obtain a fine-grained feature map, and then obtaining a correlation score map by an FC layer;

Step 8, calculating the loss values of the correlation score matrices obtained in step 4 and step 7 by using a binary cross entropy loss, respectively, combining the loss values with certain weights, and finally training a model in an end-to-end manner; and Step 9, realizing text-based video clip localization using the model trained in step 8.

The first step size is larger than the second step size.

Further, a method of extracting video features and text features respectively in step 1 includes the following steps:

Step 1-1, dividing a video into several video units at certain intervals, extracting visual features of each video unit by using a pre-trained CNN model, and finally obtaining the video features by average pooling and the FC layer;

Step 1-2, transforming each word in a textual sentence into an embedding vector using a Glove word2vec model, learning the relationship between words by a LSTM network to, and taking output features of a last hidden state as the text features.

Further, the step 2 specifically includes the following sub-steps:

Step 2-1, sampling the video features obtained in step 1 with a large step size to obtain temporally ordered basic clip feature vectors, and obtaining a series of temporally continuous clips with different lengths by combining basic clips;

Step 2-2, selecting candidate clips from all possible clips by a sparse sampling strategy, which reduces redundant information as much as possible without affecting the performance of the model;

Step 2-3, for each candidate clip, performing a maximum pooling operation on the basic clips, thus obtaining the features of the candidate clips;

Step 2-4, representing the features of all candidate clips using a two-dimensional feature map, with starting and ending positions of each candidate clip corresponding to the coordinates of the two-dimensional feature map, and placing the features thereof in the corresponding positions to finally obtain a two-dimensional feature map of the candidate clips.

Further, in step 3, the text features and the features of the candidate clips are mapped to a same dimensional space through an FC layer, respectively, and then the fused features are obtained through Hadamard Product and Frobenius normalization.

Further, step 4 specifically includes the following sub-steps:

Step 4-1, feeding the fused features to a two-layer convolutional neural network to learn the correlation between the candidate clips and the text to obtain an intermediate feature map with a same shape as inputs. In an embodiment, the intermediate feature map will transfer learning information to the fine time granularity localization stage;

Step 4-2, feeding the intermediate feature map obtained in step 4-1 to the FC layer to obtain the correlation score map of the candidate clips in the coarse time granularity localization stage.

Further, step 5 specifically includes the following sub-steps:

step 5-1, sampling the video features obtained in step 1 with a second step size to obtain a series of temporally ordered basic clip feature vectors;

Step 5-2, updating the basic clip feature vectors by a conditional feature update module using the intermediate feature map obtained in step 4-1, and obtaining a series of temporally continuous clips through a combination of the basic clips. In an embodiment, it is desirable that a current stage can focus on the areas that have great relevance to the text, and this kind of information has been learned in the coarse time granularity localization stage; the conditional feature update module is to update the features of the current stage by learning weights using the information in the coarse time granularity localization stage;

Step 5-3, selecting candidate clips from all possible clips by the sparse sampling strategy, performing the maximum pooling operation on the basic clips in each candidate clip interval to obtain the features of the candidate clips, and representing the features of all candidate clips with the two-dimensional feature map to obtain the two-dimensional feature map of the candidate clips in the fine time granularity localization stage.

Further, the specific steps of updating the basic clip feature vectors by the conditional feature update module are as follows:

The intermediate feature map $H^{t-1}$ of a stage $t-1$ is transformed into $h^{t-1}$ by the maximum pooling operation;

For the basic clip feature vector $c_i^t$ of each stage t, a weight $a_i^t$ is learned in combination with the information of the stage $t-1$, which is expressed by the formula as follows:

$$a_i^t = \text{sigmoid}(W_r^t \cdot (h^{t-1} \odot c_i^t) + b_r^t),$$

where $W_r^t$ and $b_r^t$ are parameters to be learned, $\odot$ is Hadamard Product, and sigmoid is a nonlinear sigmoid activation function;

An updated feature vector $\overline{c}_i^t$ of each basic clip is obtained according to the learned weight $a_i^t$, that is:

$$\overline{c}_i^t = c_i^t \odot a_i^t.$$

Further, step 6 specifically includes the following sub-steps:

Step 6-1 fusing the candidate clip features and the text features to obtain the fused features of the stage t;

Step 6-2, fusing the intermediate feature map $H^{t-1}$ in the stage $t-1$ obtained in step 4-1 with the feature map $F^t$ in the stage t obtained in step 6-1 by up-sampling connection, and obtaining the fused feature map $G^t$; the formula is as follows:

$$G^t = F^t \circledast \text{sigmoid}(\{\text{Conv}_k(\text{upsample}(H^{t-1}))\}_n)$$

where the subscript n indicates n-th up-sampling and convolution operations, the subscript k indicates a size of a convolution kernel, $\circledast$ is element-wise maximum pooling, and sigmoid is a nonlinear sigmoid activation function.

Further, step 7 specifically includes the following sub-steps:

Step 7-1, feeding the fused features to a two-layer convolutional neural network to learn the correlation between the candidate clips and the text, and obtaining the intermediate feature map with fine time granularity;

Step 7-2, feeding the intermediate feature map obtained in step 7-1 to an FC layer to obtain the correlation score map of the candidate clips in the fine time granularity localization stage.

Further, in step 9, the step of progressively realizing the localization of video clips by using the trained model includes the following steps:

Step 9-1, feeding a query text and a corresponding video into the model to obtain correlation score matrices with different time granularities;

Step 9-2, selecting the correlation score map of the stage with the finest granularity, sorting the candidate clips according to scores, selecting the candidate clip with a highest score as the target clip, and returning the position information of the target clip in the original video.

The method has the following advantages that: firstly, different feature extraction methods are used to extract features of video and text modes respectively; then, different step sizes are progressively chosen to learn the correlation between video and text in multiple stages; finally, the model is trained in an end-to-end manner by combining the correlation loss of each stage. At the same time, by the conditional feature update module and the up-sampling connection, the fine time granularity stage fuses the information of the coarse time granularity stage, so that different stages promote each other. Different stages can pay attention to clips with different time granularities, and the model can cope with the obvious change of target clip length by combining with the interrelation between stages. According to the present disclosure, the thinking mode of processing a clip localization task by human beings is used for reference, a localization mode from coarse to fine is adopted, the target clip is positioned in a multi-stage and progressive manner, and the localization performance is greatly improved.

DESCRIPTION OF EMBODIMENTS

The present disclosure will be described in detail below with reference to the drawings and specific embodiments.

Figure 1:
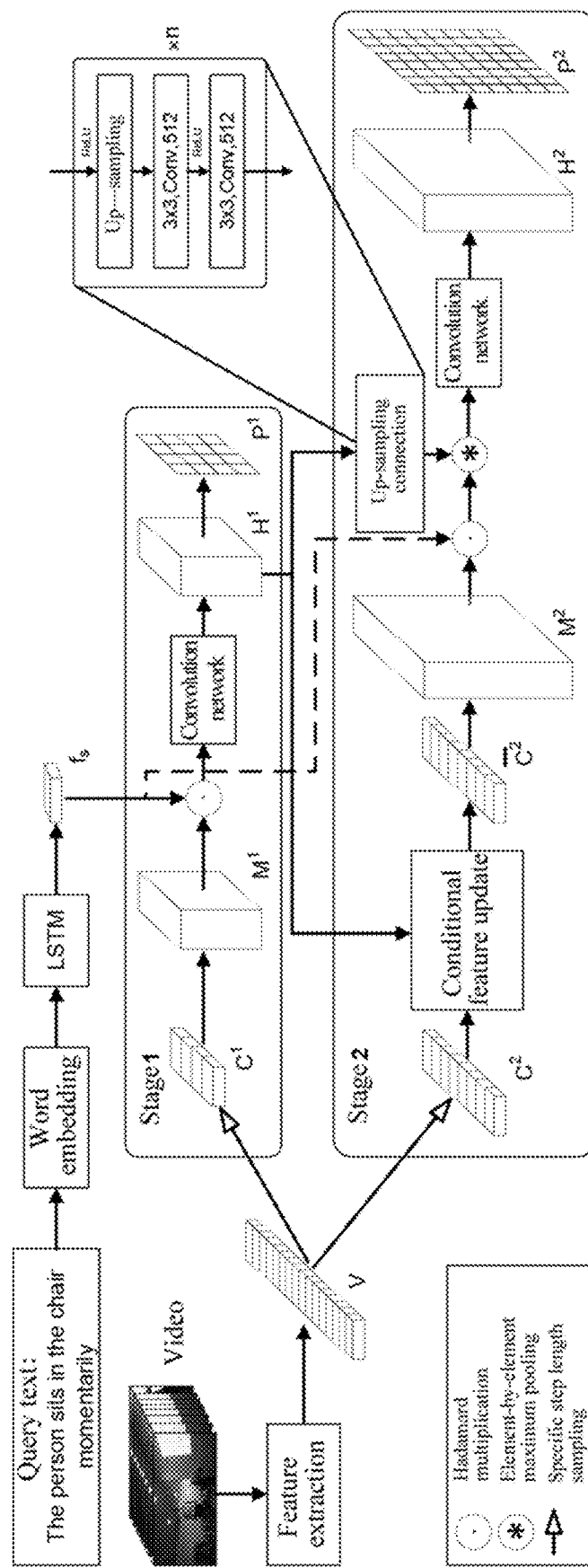
FIG. 1 is a schematic diagram of a progressive localization network structure for text-to-video clip localization.

To solve the problem of text-to-video clip localization, the present disclosure proposes a progressive localization method for text-to-video clip localization, which is realized based on a progressive localization network, and the structure of the progressive localization network is shown in FIG. 1. The method includes the following specific steps.

Step 1, video features and text features are extracted respectively by using different feature extraction methods.

Step 1-1, for a given video, it is divided to 256 video units (note that the length of each video unit after division is different because of its different length of origin video). For each video unit, the deep features of all frames are extracted by using a convolution neural network (CNN) model trained on an ImageNet data set, the features in each video unit are merged by average pooling, and then the dimension of each video unit is reduced by an FC layer to obtain the feature vector of the video unit. In this way, the video can be described by a series of feature vectors, $v=\{u_i\}_{i=1}^{l^v}$, where $u_i \in \mathbb{R}^{d^v}$ represents the feature vector of the $i^{th}$ video unit, $d^v=512$ represents the dimension of the feature vector and $l^v=256$ represents the number of video units.

Step 1-2, given a sentence of a length $l^s$, each word is transformed into an embedding vector using a GloVe word2vec model, and a word embedding vector sequence $\{w_1, w_2, \ldots w_{l^s}\}$ can be obtained, where wt is the embedding vector of the $t^{th}$ word. Because words in a sentence are closely related to each other, it is very important to model the context of each word for the full representation of text features. LSTM is a special recurrent neural network (RNN), which can learn the dependencies between words in sentences. Therefore, the embedding vector sequence is fed to the learning of a three-layer two-way LSTM network, so as to establish a sufficient connection between words, and the output vector of the last hidden state is selected as the feature vector of the text, which is represented by $f_s \in \mathbb{R}^{d^s}$, where $d^s=512$ indicates the size of each hidden state of the LSTM network.

Step 2, after the video features and text features are obtained, candidate clips need to be generated. A coarse-to-fine and progressive idea is adopted to solve the task of localizing video clips that are relevant to the given textual query. Therefore, at first, the model is allowed to learn the correlation between the candidate clips with a coarse time granularity and the text with a larger step size, which is called a coarse time granularity branching. Firstly, a feature map of candidate clips is constructed, and the specific steps are as follows:

Step 2-1, sampling the video features obtained in step 1-1 with a first step size $s^1$ to obtain a series of basic clips, that is, $C^1=\{c_i^1\}_{i=1}^{N^1}$, $c_i^1$ represents the feature vector of the $i^{th}$ basic clip, which is obtained by average pooling of the video feature vectors in the corresponding interval. Average pooling can make the basic clip retain the video information in the corresponding interval. $N^1=l^v/s^1$ indicates the number of basic clips. In order to represent different stages with different step sizes, the superscript is used to represent the current stage (for example, the superscript 1 here represents the first stage). With the increase of superscript, the step size will decrease by multiple, thus obtaining the feature representation with different time granularities.

Step 2-2, theoriotically, there are $\Sigma_{k=1}^{N^1} k$ different candidate clips for the $N^1$ basic clips obtained in step 2-1. In order to reduce the computational cost and remove more redundant information, the model adopts the following strategy to select candidate clips: if $N^1 \leq 16$, all possible candidate clips are selected; otherwise, for any clip from $c_a^1$ to $c_b^1$, if G(a, b)=1 is satisfied, it will be selected. G(a, b) can be obtained by the following formula:

$$G(a,b) \leftarrow (a \bmod s=0) \& ((b-s') \bmod s=0),$$

where s and s' are defined as follows:

$$s = 2^{k-1},$$

$$s' = \begin{cases} 0, & \text{if } k=1, \\ 2^{k+2}-1, & \text{otherwise} \end{cases}$$

where $k = \left\lceil \log_2\left(\frac{b-a+1}{8}\right) \right\rceil$, $\lceil \cdot \rceil$ represents an upward rounding function.

Step 2-3, maximum pooling processing is carried out on the basic clip features contained in each selected candidate clip to obtain the feature vectors of the candidate clips. For example, for a candidate clip from $c_a^1$ to $c_b^1$, its feature $m_{a,b}^1 = \text{maxpool}(c_a^1, c_{a+1}^1, \ldots, c_b^1)$ Here, the maximum pooling operation is similar to a feature selection, and it is desirable that the features with better discrimination can be kept for the next step of learning.

Step 2-4, the feature vectors of all candidate clips are stored in a two-dimensional feature map according to their positions, obtaining $M^1 \Sigma \mathbb{R}^{N^1 \times N^1 \times d^v}$, where $M^1[a, b,:] = m_{a,b}^1$, and all invalid positions (including those that are not selected and those whose start time is less than the end time) are filled with 0.

Step 3, after obtaining the feature map of the candidate clip, it is necessary to combine the information of the text. The specific steps are as follows:

Firstly, the text features and candidate clip features are mapped to a $d''=512$–dimensional space through an FC layer respectively, and then a fused feature $F^1$ is obtained through Hadamard Product and Frobenius normalization. The above process is expressed as:

$$F^1 = \|(W_v \cdot M^1) \odot (W_s \cdot f_s \cdot 1^T)\|_F$$

where $W_v$ and $W_s$ are the parameters to be learned in the FC layer of candidate clip features and text features, respectively, $1^T$ represents the row vector of all 1, and $\odot$ and $\|\cdot\|_F$ represent Hadamard Product and Frobenius normalization, respectively.

Step 4, the fused features are fed to a convolution neural network to obtain the feature map, and then a correlation score map is obtained by a fully connected FC layer. The specific steps are as follows:

Step 4-1, the fused feature $F^1$ is fed to a two-layer convolutional neural network to learn the correlation between the candidate clips and the text to obtain a feature map $H^1$. In a two-layer convolutional neural network, a 5×5 convolution kernel is used. At the same time, as the shape of the map $H^1$ is related to the position of the candidate clip, padding is used in the convolution process to remain the output size unchanged.

Step 4-2, through the leaning of the convolution neural network, the model has learned the correlation between the candidate clips and the text, and this information is stored in the feature map $H^1$. In order to make the correlation information in the feature map clearer, the feature map $H^1$ is fed to an FC layer to get a correlation score map $P^1 \in \mathbb{R}^{N_1 \times N_1}$. The value of each position in the feature map $P^1$ represents the correlation between the candidate clip at the current position and the textual query. The higher the score, the more relevant the candidate clip is to the text. The correlation score map can be expressed by the formula as follows:

$$P^1 = W^1 \cdot H^1 + b^1$$

where $W^1$ and $b^1$ are the parameters to be learned.

Step 5, obtaining the correlation score of the coarse time granularity branch means that the location of the current branch has been completed, but this branch only pays attention to the coarse-grained candidate clips and cannot cope with the shorter target clips. The progressive localization network also has a fine time granularity localization branch, which solves the defects of the first branch and pays attention to those short target clips. Of course, the two branches are not independent learning. A conditional feature update module and the up-sampling connection are designed to connect the two branches.

For the learning of fine time granularity branch, the feature map of candidate clips is first constructed and the specific steps are as follows:

Step 5-1, the video features obtained in step 1-1 are sampled with a second step size $s^2$ (relative to step 2-1) to obtain a basic clip feature vector $C^2 = \{c_i^2\}_{i=1}^{N^2}$. In this embodiment, the first step size is 10 seconds and the second step size is 2 seconds.

Figure 2:
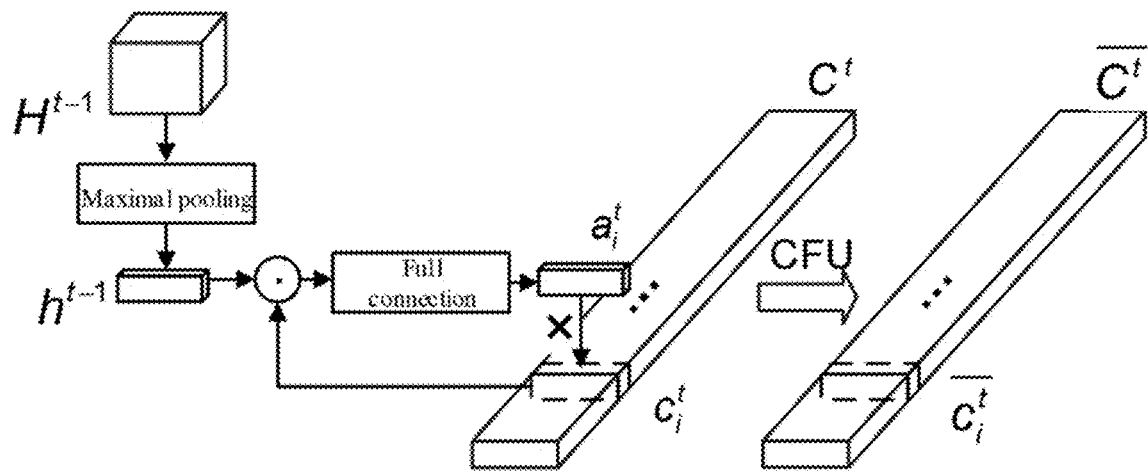
FIG. 2 is a schematic diagram of the structure of a conditional feature update module in the progressive localization network.

Step 5-2, before generating candidate clips, the information learned in the previous branch is used for the first time; the feature map $H^1$ obtained in step 4-1 implies the correlation between the candidate clips and the query text, and it is desirable to update $C^2$ in combination with the correlation; the basic clip feature vector $C^2$ is updated by the conditional feature update module, as shown in FIG. 2; the specific steps are as follows:

First of all, $H^1 \in \mathbb{R}^{d^v \times N^1 \times N^1}$ is converted into $h^1 \in \mathbb{R}^{d^v \times N^1}$ by a maximum pooling operation.

Then, for each $c_i^2$, a weight $a_i^2$ is learned by combining the information of the previous branch, which is expressed as follows:

$$a_i^2 = \text{sigmoid}(W_r^2 \cdot (h^1 \odot c_i^2) + b_r^2),$$

where $W_r^2$ and $b_r^2$ represent parameters to be learned, $\odot$ represents Hadamard Product, and sigmoid represents a nonlinear sigmoid activation function.

Finally, the learned weights can be used to get the updated feature vector $\overline{c_i^2}$ of each basic clip, namely:

$$\overline{c_i^2} = c_i^2 \odot a_i^2$$

With the aid of the conditional feature update module, the correlation information learned by the coarse time granularity branch is passed to the fine time granularity branch, so that those areas with stronger correlation can get more attention.

Step 5-3, the feature vector $\overline{C^2}$ of the updated basic clip is obtained, and the two-dimensional feature map $M^2$ of the fine time granularity branch is obtained by the methods of steps 2-2, 2-3 and 2-4.

Step 6, similarly, the feature of the candidate clips of the fine time granularity branch needs to be fused with the given text. After that, the information of the coarse time granularity branch will be used for the second time. The specific steps are as follows:

Step 6-1, the candidate clip feature map and text features are fused to obtain fused feature $F^2$ by the method of step 3;

Step 6-2, the relevant information of the previous branch is indirectly utilized by learning a weight in Step 5-2; here, it is desirable to use them more directly, so up-sampling connection is designed; the details are as follows:

First of all, it should be clear that it is the feature map $H^1$ learned by convolutional neural network in step 4-1 that contains relevant information in the previous step;

Next, it is noted that the shapes of $H^1$ and $F^2$ are different due to the different step sizes of the two branches, and the shape of $F^2$ should be larger.

Therefore, first, $H^1$ is upsampled to make the two shapes consistent; and then the up-sampled $H^1$ is fed to a two-layer convolutional neural network ($\text{Conv}_k$, where the subscript k indicates the size of the convolutional kernel, which can be 3).

After performing up-sampling and convolution operations n times, the shapes of $H^1$ and $F^2$ are consistent, and then the activation function sigmoid is applied.

Finally, it is fused with the fusion feature $F^2$ through element-by-element maximum pooling ($\circledast$) to obtain the feature map $G^2$.

The above process can be expressed as:

$$G^2 = F^2 \circledast \text{sigmoid}(\{\text{Conv}_k(\text{upsample}(H^1))\}_n)$$

where the subscript n indicates n-th up-sampling and convolution operations, which also means that the shape of $H^1$ is expanded by $$\sqrt[n]{\frac{N^2}{N^1}}$$

times in each up-sampling.

The feature update module makes the fine granularity branch pay more attention to the video features through constraints, and the up-sampling connection keeps the features with better recognition in the candidate clips of the two stages by way of feature selection, so that the model has better localization ability.

Step 7, the same method as step 4-2 is adopted, and the correlation score map $P^2$ of the fine time granularity branch is obtained by the two-layer convolutional neural network and the FC layer.

Step 8, after the above steps, each branch gets a correlation score map which reflects the correlation between the candidate clip and the query text. A binary cross entropy function is used to calculate the localization loss of each branch:

$$\Lambda_t = -\frac{1}{V^t} \sum_{i=1}^{V^t} y_i^t \log p_i^t + (1 - y_i^t) \log(1 - p_i^t),$$

where $p_i^t \in \text{sigmoid}(P^t)$ indicates the predicted label between 0 and 1 converted according to the correlation score of candidate clips, $V^t$ is the number of candidate clips at the stage t, $V^t$ is the ground-truth label of each candidate clip at the stage t. In application, the idea of "soft label" is used, that is, the ground-truth label of each candidate clip is not all "either 1 or 0", and they are classified according to the Intersection over Union (IoU) $o_i^t$ of the candidate clip and the target clip, which can be represented as:

$$y_i^t = \begin{cases} 0, & o_i^t \leq \tau \\ \dfrac{o_i^t - \tau}{1 - \tau}, & \text{others} \end{cases}$$

where τ is a threshold, which can be 0.5.

Finally, the total loss of T branches of the model can be expressed as:

$$\mathcal{L} = \Sigma_{t=1}^{T} \lambda_t \mathcal{L}_t,$$

where $\lambda_t$ represents the weight of the stages t.

With the total loss function, the progressive localization network model can be trained in an end-to-end manner.

It is worth noting that, due to the sparse sampling strategy in step 2-2, the scores in the correlation score map are not all valid. A map with the same shape as the candidate clip feature map is used to record each valid position, and the final correlation score will be filtered by the recording map of each branch.

In addition, at last, the model can generate several correlation score matrices with different time granularities, and the fine time granularity branch often has better performance through conditional feature update module and up-sampling connection.

Step 9, by the training in step 8, the model has learned how to select the one most relevant to the query text from the candidate clips. Given a query and a corresponding video, the model can finally output the start and end time of the most relevant clip in the video with respect to the given query. The steps are as follows:

Step 9-1, given text and video are input into the model, and several correlation score matrices with different time granularities can be obtained;

Step 9-2, the score map of the branch with the finest granularity is selected; after the invalid scores are filtered by the recording map, they are sorted according to the scores, the one with the highest score is selected, and converted into the original time according to its coordinates and the step size of previous sampling; and the result is returned.

The concrete implementation steps of the progressive localization network with two branches have been introduced above. In practical application, the branches can be increased by reasonably selecting the step size, thus obtaining an optimal effect.

What is claimed is:

1. A progressive localization method for text-to-video clip localization, comprising:
    step 1: extracting a video feature and a text feature, respectively, by using different feature extraction methods;
    step 2: coarse-time-granularity localization: sampling the video feature obtained in step 1 with a first step length to generate a candidate clip;
    step 3: fusing the candidate clip obtained in step 2 with the text feature obtained in step 1;
    step 4: feeding the fused feature to a convolution neural network to obtain a coarse-grained feature map, and then obtaining a correlation score map via an fully-connected (FC) layer;
    step 5: fine-time-granularity localization: sampling the video feature obtained in step 1 with a second step size, updating the features by a conditional feature update module by combining with the feature map obtained in step (4), and then generating a candidate clip, wherein the first step is greater than the second step;
    step 6: fusing the candidate clip in step 5 with the text features obtained in step 1, and fusing the candidate clip in step 5 by combining the feature map obtained in step 4 through up-sampling connection;
    step 7: feeding the fused features to the convolution neural network to obtain a fine-grained feature map, and then obtaining a correlation score map by an FC layer;
    step 8: calculating a loss value of the correlation score matrices obtained in step 4 and step 7 by using binary cross entropy loss, respectively, combining the loss value with a certain weight, and finally training a model in an end-to-end manner; and
    step 9: realizing text-based video clip localization by using the model trained in step 8.

2. The method according to claim 1, wherein said extracting a video feature and a text feature, respectively, in step 1 comprises:
    step 1-1: dividing a video into several video units at a certain interval, extracting visual features of each video unit by using a pre-trained CNN model, and finally obtaining the video features by average pooling and an FC layer; and
    step 1-2: transforming each word in a text into an embedding vector by using a Glove word2vec model, learning the relationship between words by a LSTM network to, and taking output features of a last hidden state as the text features.

3. The method according to claim 1, wherein step 2 comprises:
    step 2-1: sampling the video features obtained in step 1 with a large step size to obtain temporally ordered basic clip feature vectors, and obtaining a series of temporally continuous clips with different lengths by combining basic clips;
    step 2-2: selecting a candidate clip from all candidate clips by a sparse sampling strategy, and reducing redundant information as much as possible without affecting the performance of the model;
    step 2-3: performing a maximum pooling operation on the basic clips in each candidate clip interval to obtain a feature of the candidate clip; and
    step 2-4: representing features of all candidate clips by using a two-dimensional feature map, with starting and ending positions of each candidate clip corresponding to coordinates of the two-dimensional feature map, and placing a feature of each candidate clip in corresponding positions to finally obtain a two-dimensional feature map of the candidate clip.

4. The method according to claim 1, wherein in step 3, the text features and the features of the candidate clips are mapped to a same dimensional space through an FC layer, and then the fused feature is obtained through Hadamard Product and Frobenius normalization.

5. The method according to claim 1, wherein step 4 comprises:
    step 4-1: feeding the fused feature to a two-layer convolutional neural network to learn the correlation between the candidate clip and the text to obtain an intermediate feature map with a same shape as an input, wherein the intermediate feature map will transfer learning information to the fine time granularity localization stage; and
    step 4-2: feeding the intermediate feature map obtained in step 4-1 to an FC layer to obtain the correlation score map of the candidate clip in the coarse time granularity localization stage.

6. The method according to claim 5, wherein step 5 comprises:

step 5-1: sampling the video feature obtained in step 1 with a second step size to obtain a series of temporally ordered basic clip feature vectors;

step 5-2: updating the basic clip feature vectors by a conditional feature update module by using the intermediate feature map obtained in step 4-1, and obtaining a series of temporally continuous clips through a combination of the basic clips; wherein a current stage is desired to be focused on an area that have great relevance to the text, which has been learned in the coarse time granularity localization stage; the conditional feature update module is to update the features of the current stage by learning weights by using information in the coarse time granularity localization stage; and step 5-3: selecting candidate clips from all possible clips by sparse sampling strategy, performing the maximum pooling operation on the basic clips in each candidate clip interval to obtain the features of the candidate clip, and representing the features of all candidate clips with the two-dimensional feature map to obtain the two-dimensional feature map of the candidate clips during fine time granularity localization.

7. The method according to claim 6, wherein said updating the basic clip feature vectors by the conditional feature update module comprises:

the intermediate feature map $H^{t-1}$ of a stage t−1 is transformed into $h^{t-1}$ by the maximum pooling operation;

for the basic clip feature vector $c_i^t$ of each stage t, a weight $a_i^t$ is learned in combination with the information of the stage t−1, which is expressed by the formula as follows:

$$a_i^t = \mathrm{sigmoid}(W_r^t \cdot (h^{t-1} \odot c_i^t) + b_r^t),$$

where $W_r^t$ and by are parameters to be learned, $\odot$ is Hadamard Product, and sigmoid is a nonlinear sigmoid activation function;

an updated feature vector $\bar{c}_i^t$ of each basic clip is obtained according to a learned weight $a_i^t$, that is:

$$\bar{c}_i^t = c_i^t \odot a_i^t.$$

8. The method according to claim 5, wherein step 6 comprises:

step 6-1: fusing the candidate clip features and the text features to obtain the fused features of the stage t; and step 6-2: fusing the intermediate feature map $H^{t-1}$ in the stage t−1 obtained in step 4-1 with the feature map $F^t$ in the stage t obtained in step 6-1 by up-sampling connection, and obtaining the fused feature map $G^t$; wherein the formula is as follows:

$$G^t = F^t \circledast \mathrm{sigmoid}(\{\mathrm{Conv}_k(\mathrm{upsample}(H^{t-1}))\}_n)$$

where the subscript n indicates n-th up-sampling and convolution operations, the subscript k indicates a size of a convolution kernel, $\circledast$ is maximum pooling element by element, and sigmoid is a nonlinear sigmoid activation function.

9. The method according to claim 1, wherein step 7 comprises:

step 7-1 feeding the fused features to a two-layer convolutional neural network to learn the correlation between the candidate clip and the text, and obtaining an intermediate feature map with fine time granularity; and step 7-2 feeding the intermediate feature map obtained in step 7-1 to an FC layer to obtain the correlation score map of the candidate clips during fine-time-granularity localization.

10. The method according to claim 1, wherein in step 9, said progressively realizing the text-based video clip localization by using the trained model comprises:

step 9-1 inputting a query text and a corresponding video into the model to obtain correlation score matrices with different time granularities; and step 9-2 selecting correlation score matrices of a stage with the finest granularity, sorting candidate clips according to scores, selecting a candidate clip with a highest score, and returning the position information thereof in the original video.

* * * * *